(12) United States Patent
Fukai

(10) Patent No.: US 9,971,196 B2
(45) Date of Patent: May 15, 2018

(54) LIGHT SOURCE DEVICE AND DISPLAY APPARATUS

(71) Applicant: Sakai Display Products Corporation, Sakai-shi, Osaka (JP)

(72) Inventor: Hiroki Fukai, Sakai (JP)

(73) Assignee: SAKAI DISPLAY PRODUCTS CORPORATION, Osaka (JP)

(*) Notice: Subject to any disclaimer, the term of this patent is extended or adjusted under 35 U.S.C. 154(b) by 311 days.

(21) Appl. No.: 14/912,865

(22) PCT Filed: Aug. 18, 2014

(86) PCT No.: PCT/JP2014/071551
§ 371 (c)(1),
(2) Date: Feb. 18, 2016

(87) PCT Pub. No.: WO2015/025814
PCT Pub. Date: Feb. 26, 2015

(65) Prior Publication Data
US 2016/0195770 A1 Jul. 7, 2016

(30) Foreign Application Priority Data
Aug. 23, 2013 (JP) .................................. 2013-173406

(51) Int. Cl.
*F21V 17/12* (2006.01)
*F21V 29/00* (2015.01)
(Continued)

(52) U.S. Cl.
CPC .......... *G02F 1/133608* (2013.01); *F21V 3/02* (2013.01); *F21V 17/12* (2013.01);
(Continued)

(58) Field of Classification Search
CPC ........................................................ F21V 29/10
See application file for complete search history.

(56) References Cited

U.S. PATENT DOCUMENTS

| 9,664,848 B2 * | 5/2017 | Kwon ................... G02B 6/0086 |
| 2006/0227572 A1 * | 10/2006 | Chen ....................... G02B 6/009 |
| | | 362/633 |

(Continued)

FOREIGN PATENT DOCUMENTS

| JP | 2005-285714 A | 10/2005 |
| JP | 2008-58709 A | 3/2008 |

(Continued)

*Primary Examiner* — Alexander Garlen
*Assistant Examiner* — Eric T Eide
(74) *Attorney, Agent, or Firm* — Bozicevic, Field & Francis LLP; Bret E. Field

(57) ABSTRACT

Provided are a light source device capable of suppressing the occurrence of wrinkles on an optical sheet even if the optical sheet expands due to heat generated at the time of light emission, and a display apparatus including the light source device. In the light source device, an optical sheet is disposed with one surface facing the light source unit, while the light source unit and the optical sheet are supported by a support member. A contact portion being in contact with the peripheral edge part of the other surface of the optical sheet is pressed to the optical sheet by a connecting member, and the optical sheet is held between the contact portion and the support member. The contact portion and the support member holding the optical sheet are connected with each other by the connecting member. The connecting member is configured to have a weakened force of pressing the contact portion if a surrounding temperature reaches a predetermined temperature or higher.

7 Claims, 10 Drawing Sheets

(51) Int. Cl.
*F21V 3/02* (2006.01)
*G02F 1/1335* (2006.01)
*G02B 5/02* (2006.01)

(52) U.S. Cl.
CPC ............... *F21V 29/00* (2013.01); *G02B 5/02* (2013.01); *G02F 1/133606* (2013.01); *G02F 2201/54* (2013.01)

(56) References Cited

U.S. PATENT DOCUMENTS

| | | | |
|---|---|---|---|
| 2010/0020533 A1* | 1/2010 | Kamada | G02F 1/133608 362/97.1 |
| 2010/0208161 A1* | 8/2010 | Sasaki | G02F 1/133608 349/58 |
| 2010/0226136 A1 | 9/2010 | Murakoshi et al. | |
| 2012/0075551 A1* | 3/2012 | Kuromizu | G02F 1/133608 349/61 |
| 2015/0103259 A1* | 4/2015 | Gotou | G02B 6/0081 348/790 |

FOREIGN PATENT DOCUMENTS

| | | |
|---|---|---|
| JP | 2010-205868 A | 9/2010 |
| JP | 2012-043613 A | 3/2012 |

\* cited by examiner

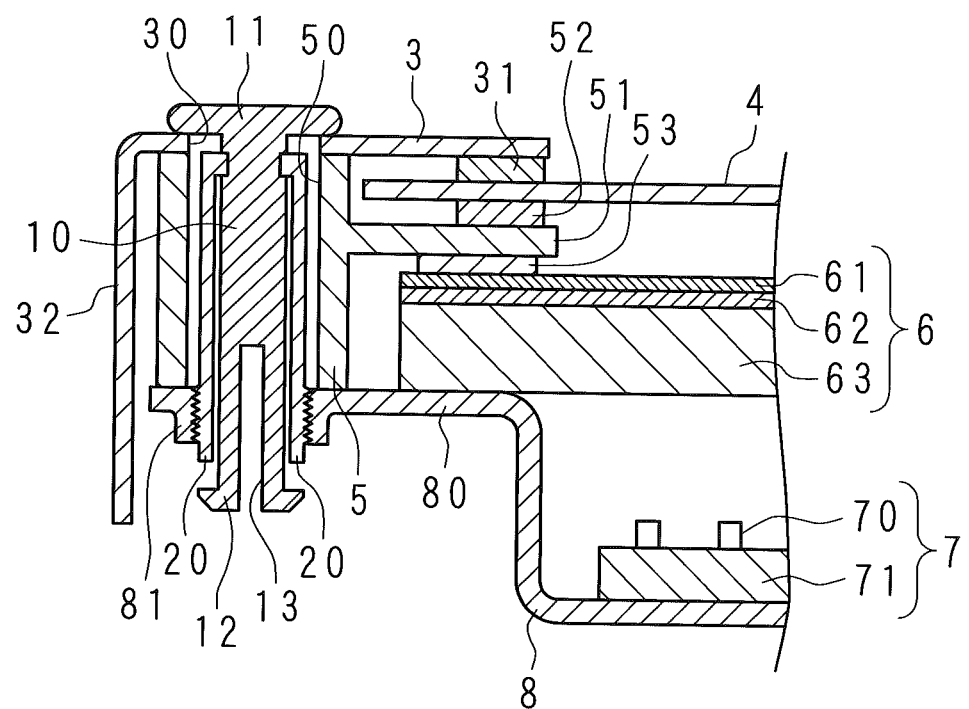
F I G. 3

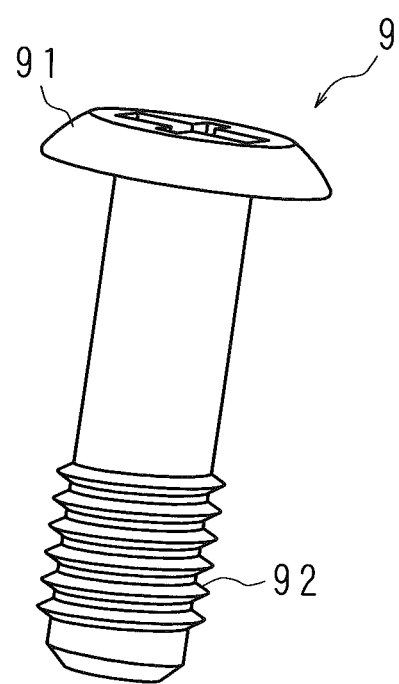
F I G. 7

LIGHT SOURCE DEVICE AND DISPLAY APPARATUS

CROSS-REFERENCE TO RELATED APPLICATION

This application is the national phase under 35 U.S.C. § 371 of PCT International Application No. PCT/JP2014/071551 which has an International filing date of Aug. 18, 2014 and designated the United States of America.

BACKGROUND

1. Technical Field

The present invention relates to: a light source device used as a light source of a display apparatus such as a liquid crystal display apparatus; and a display apparatus including the light source device.

2. Description of Related Art

In recent years, display apparatuses such as liquid crystal displays and liquid crystal televisions have widely been spread. A display apparatus includes a rectangular plate-shaped display panel which has a display surface at the front side on which an image is displayed, and a light source device disposed at the rear side of the display panel to irradiate the display panel with light. An example of the light source device includes a direct type light source device as disclosed in Japanese Patent Application Laid-Open No. 2008-58709. The light source device disclosed in Japanese Patent Application Laid-Open No. 2008-58709 is configured to include a light source such as a light emitting diode (LED) or a cold cathode fluorescent lamp (CCFL) disposed at the bottom of a dish-shaped casing and an optical sheet fixed at the opening portion of the casing. Moreover, the display apparatus disclosed in Japanese Patent Application Laid-Open No. 2008-58709 is so configured that a light source device is attached to a display panel such that the optical sheet faces the rear side of the display panel. In such a display apparatus, light from the light source is diffused by the optical sheet before entering the display panel. Further, in the light source device disclosed in Japanese Patent Application Laid-Open No. 2008-58709, a peripheral edge part of the optical sheet is held between a casing (support member) and a pressing member, while the pressing member which presses the optical sheet to the casing is made of a heat deformable material.

The optical sheet is generally made of synthetic resin, and may be shifted by oscillation during transportation if the attachment thereof to the casing is insufficient, which may damage the surface of the optical sheet. It is therefore desirable to firmly fix the optical sheet to the casing so as not to move during transportation.

When the display apparatus is in use, on the other hand, light emitted by the light source generates heat and the heat from the light source causes the optical sheet to expand, which causes wrinkles on the optical sheet expanded by the heat if the optical sheet is firmly fixed to the casing. In order to suppress the occurrence of wrinkles, it is desirable not to firmly fix the optical sheet but to fix it in such a manner that the expanded optical sheet has a margin to spread in the surrounding area.

In the light source device disclosed in Japanese Patent Application Laid-Open No. 2008-58709, a pressing member which presses the optical sheet to the casing is made of a heat deformable material, which increases the pressing force by the pressing member when the light source is turned off and decreases the pressing force by the pressing member when the light source is turned on.

SUMMARY

In recent years, as a display apparatus is made thinner, a light source device has also been desired to be thinner, and hence a space near the peripheral edge part of an optical sheet is often narrow inside the casing of the light source device. It is therefore difficult, in the configuration disclosed in Japanese Patent Application Laid-Open No. 2008-58709, to ensure a space where a pressing member which presses the optical sheet can sufficiently be deformed in order to prevent the occurrence of wrinkles on the expanded optical sheet. If the pressing member is not sufficiently deformed, such a problem is caused that wrinkles on the expanded optical sheet cannot be prevented from occurring.

The present invention has been made with the aim of solving the above problems. An object of the present invention is to provide a light source device which can prevent wrinkles from occurring on an optical sheet when the optical sheet is expanded, and a display apparatus including the light source device.

A light source device according to one embodiment of the present invention comprises a light source, an optical sheet disposed with one surface facing the light source, and a support member which supports the light source and the optical sheet. The light source device emits light made incident in the optical sheet through the one surface thereof from the light source, from the other surface of the optical sheet. The light source device further comprises: a contact portion which is in contact with a peripheral edge part of the other surface of the optical sheet to hold the optical sheet between the contact portion and the support member; and a connecting member which connects the contact portion and the support member in a state where the contact portion is pressed to the optical sheet. The connecting member has a weakened force of pressing the contact portion if a surrounding temperature reaches a predetermined temperature or higher.

According to the embodiment of the present invention, in the light source device in which light from the light source enters one surface of the optical sheet and is output from the other surface thereof, the peripheral edge part of the optical sheet is held between the contact portion and the support member. In the embodiment, the contact portion is pressed to the optical sheet and is connected to the support member by the connecting member, holding the optical sheet between the contact portion and the support member. In the embodiment, the connecting member decreases its force for pressing the contact portion as the surrounding temperature increases. Thus, in the embodiment, when the light source is not emitting light, the contact portion and the support member are firmly connected by the connecting member, so that the optical sheet is firmly held by the contact portion and the support member. On the other hand, in the embodiment, when the light source is emitting light, the connection between the contact portion and the support member by the connecting member is loosened, so that the expanded optical sheet can spread to the surrounding area, suppressing the occurrence of wrinkles due to heat expansion of the optical sheet.

In the light source device according to the embodiment of the present invention, it is preferred that the connecting member includes a pressing member pressing the contact portion to the peripheral edge part of the other surface of the optical sheet, and an attachment member having a latch part latched to the pressing member and being attached to the support member, and the attachment member is formed of a shape memory alloy, and is configured to be deformed to a shape in which a latch to the pressing member by the latch part is disengaged if the surrounding temperature reaches the predetermined temperature or higher.

According to the preferred embodiment of the present invention, the connecting member is constituted by a pressing member which presses the contact portion to the optical sheet, and an attachment member which is latched to the pressing member while being attached to the support member. In the preferred embodiment, the attachment member is formed of a shape memory alloy, and is deformed to a shape of being unlatched from the pressing member when the surrounding temperature reaches a predetermined temperature or higher. Thus, in the preferred embodiment, the latch between the pressing member and the attachment member is released when the light source is emitting light, which loosens the connection between the contact portion and the support member. In the preferred embodiment, this allows the expanded optical sheet to appropriately spread to the surrounding area, suppressing the occurrence of wrinkles due to heat expansion of the optical sheet.

In the light source device according to the embodiment of the present invention, it is preferred that the pressing member has a columnar shape, and includes latch pieces respectively protruding from each end of an outer peripheral surface of the pressing member, and a concave part formed at an appropriate position on the outer peripheral surface, and the attachment member has a tubular shape, and includes a screw part formed on an outer peripheral surface of the attachment member, and a claw protruding from one end surface of the attachment member in an axial direction and having a protruding end bent inward, and the connecting member is so configured that the pressing member is inserted into the attachment member, each latch piece is engaged with each end of the attachment member and the claw is engaged with the concave part, and the support member has the shape of a plate supporting the optical sheet from the one surface side and has a screw hole penetrating the support member in a thickness direction, the contact portion has a shape of a frame plate and has a through hole penetrating the contact portion in a thickness direction, and the connecting member is configured to connect the contact portion and the support member by screwing the screw part into the screw hole via the through hole.

According to the preferred embodiment of the present invention, the pressing member is formed in a columnar shape, and has latch pieces at each end of the outer peripheral surface thereof and a concave part at an appropriate position on the outer peripheral surface thereof. In the preferred embodiment, the attachment member is formed in a tubular shape, and has a screw part at the outer peripheral surface thereof and a claw at one end surface thereof. In the preferred embodiment, the connecting member is so configured that the pressing member is inserted into the attachment member, each latch piece is engaged with each end of the attachment member, and the claw is engaged into the concave part. In the preferred embodiment, by the claw of the attachment member being thus engaged into the concave part of the pressing member, the axial and circumferential positions of the attachment member and the pressing member inserted into the attachment member are fixed. Moreover, in the preferred embodiment, when the light source is emitting light, the engagement between the claw of the attachment member and the concave part of the pressing member is released, which loosens the connection between the contact portion and the support member. Accordingly, in the preferred embodiment, the connection between the contact portion and the support member may be loosened even in a narrow space, which can suppress the occurrence of wrinkles due to heat expansion of the optical sheet. Furthermore, in the preferred embodiment, the latch piece at each end of the pressing member is latched to each end of the attachment member, which can prevent the pressing member from falling off the attachment member.

In the light source device according to the embodiment of the present invention, it is preferred that the concave part is formed on an outer peripheral surface of the pressing member at one end side of the pressing member, and the other end of the pressing member is provided with a slot passing through a center of the pressing member.

According to the preferred embodiment of the present invention, the other end of the pressing member is provided with a slot, and the outer diameter of the pressing member is smaller by the size corresponding to the slot when the pressing member is inserted into the attachment member from the other end. In the preferred embodiment, this facilitates insertion of the pressing member into the attachment member. Moreover, in the preferred embodiment, after the other end of the pressing member passes through the attachment member, the slot is returned to its original shape, and the latch piece at the other end side of the pressing member is engaged with the end surface of the attachment member.

In the light source device according to the embodiment of the present invention, it is preferred that the connecting member has a columnar shape, and includes a pressing piece protruding from one end of an outer peripheral surface of the connecting member to press the contact portion to the optical sheet, and a screw part formed at the other end side of the outer peripheral surface, and the support member has a shape of a plate supporting the optical sheet from the one surface side, and has a screw hole penetrating the support member in a thickness direction, the contact portion has a shape of a frame plate and has a through hole penetrating the contact portion in a thickness direction, and the connecting member is configured to connect the contact portion and the support member by screwing the screw part into the screw hole via the through hole, and the pressing piece is formed of a shape memory alloy, and is deformed to a shape with a weakened force of pressing the contact portion if a surrounding temperature reaches the predetermined temperature or higher.

According to the preferred embodiment of the present invention, the connecting member is formed in a columnar shape, has a pressing piece at one end of the outer peripheral surface thereof, and has a screw part at the other end of the outer peripheral surface thereof. In the preferred embodiment, the connecting member connects the contact portion and the support member by screwing the screw part into a screw hole formed in the support member via the through hole formed in the contact portion. In the preferred embodiment, the pressing piece of the connecting member is formed of a shape memory alloy, and is deformed to have a shape which decreases the force of pressing the contact portion when the surrounding temperature reaches a predetermined temperature or higher. Accordingly, in the preferred embodiment, when the light source is emitting light, the force of the pressing piece pressing the contact portion to the optical sheet is decreased, and thus the connection between the contact portion and the support member is loosened. In the preferred embodiment, this allows the expanded optical sheet to appropriately spread to the surrounding area, which can suppress the occurrence of wrinkles due to heat expansion of the optical sheet.

In the light source device according to the embodiment of the present invention, it is preferred that the pressing piece protrudes from the one end of the outer peripheral surface to be inclined toward the other end, and is deformed to a shape having a coplanar surface with one end surface of the connecting member if the surrounding temperature reaches the predetermined temperature or higher.

According to the preferred embodiment of the present invention, the pressing piece is formed to protrude from one end of the outer peripheral surface of the connecting member while inclining toward the other end, and is deformed to be a shape coplanar with one end surface of the connecting member when the surrounding temperature reaches a predetermined temperature or higher. Thus, in the preferred embodiment, when the light source is emitting light, the connection between the contact portion and the support member is loosened due to the deformed pressing piece. Accordingly, in the preferred embodiment, the connection between the contact portion and the support member can be loosened even in a narrow space, which can suppress the occurrence of wrinkles due to heat expansion of the optical sheet.

A display apparatus according to one embodiment of the present invention comprises: any one of the light source devices described above; and a display panel which displays an image using light emitted from the light source device.

According to the embodiment of the present invention, even in the case where the optical sheet is expanded when the light source emits light, wrinkles occurring on the optical sheet can be suppressed, which can avoid deterioration in the display quality caused by the occurrence of wrinkles on the optical sheet.

According to one embodiment of the present invention, in the light source device in which light from the light source enters one surface of the optical sheet and is output from the other surface thereof, the peripheral edge part of the optical sheet is held between the contact portion and the support member, and the contact portion is connected to the support member by the connecting member. In the embodiment, the connecting member is so configured as to decrease the force of the connecting member pressing the contact portion to the optical sheet as the surrounding temperature increases. Thus, in the embodiment, the contact portion and the support member are firmly connected by the connecting member when the light source is not emitting light, and the connection between the contact portion and the support member by the connecting member is loosened when the light source is emitting light. Accordingly, in the embodiment, the optical sheet is firmly held by the contact portion and the support member during transportation, whereas the expanded optical sheet spreads to the surrounding area when the light source emits light, which can suppress the occurrence of wrinkles due to heat expansion of the optical sheet.

The above and further objects and features will more fully be apparent from the following detailed description with accompanying drawings.

BRIEF DESCRIPTION OF THE SEVERAL VIEWS OF THE DRAWINGS

FIG. 3 is a cross-sectional view taken along the line III-III in FIG. 1;

FIG. 7 is a perspective view illustrating a configuration of a connecting member according to Embodiment 2;

DETAILED DESCRIPTION

The following will describe in detail a light source device and a display apparatus including the light source device according to the present invention with reference to the drawings illustrating some embodiments thereof.

Embodiment 1

Figure 1:
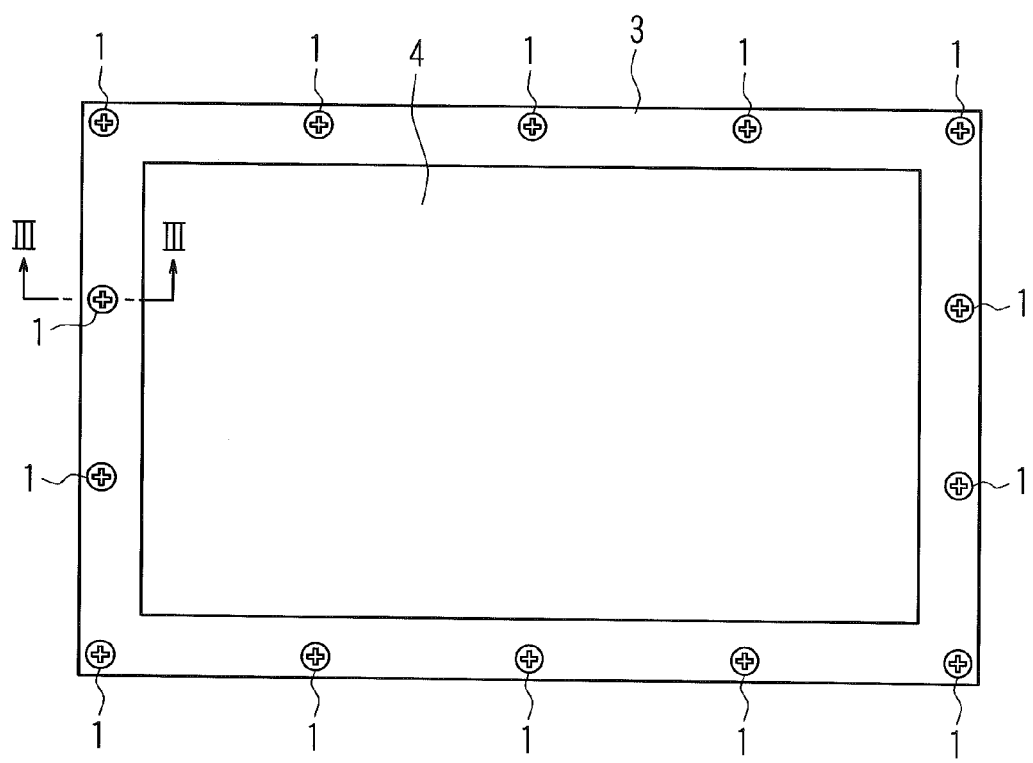
FIG. 1 is a front view of a display apparatus according to Embodiment 1.
Figure 2:
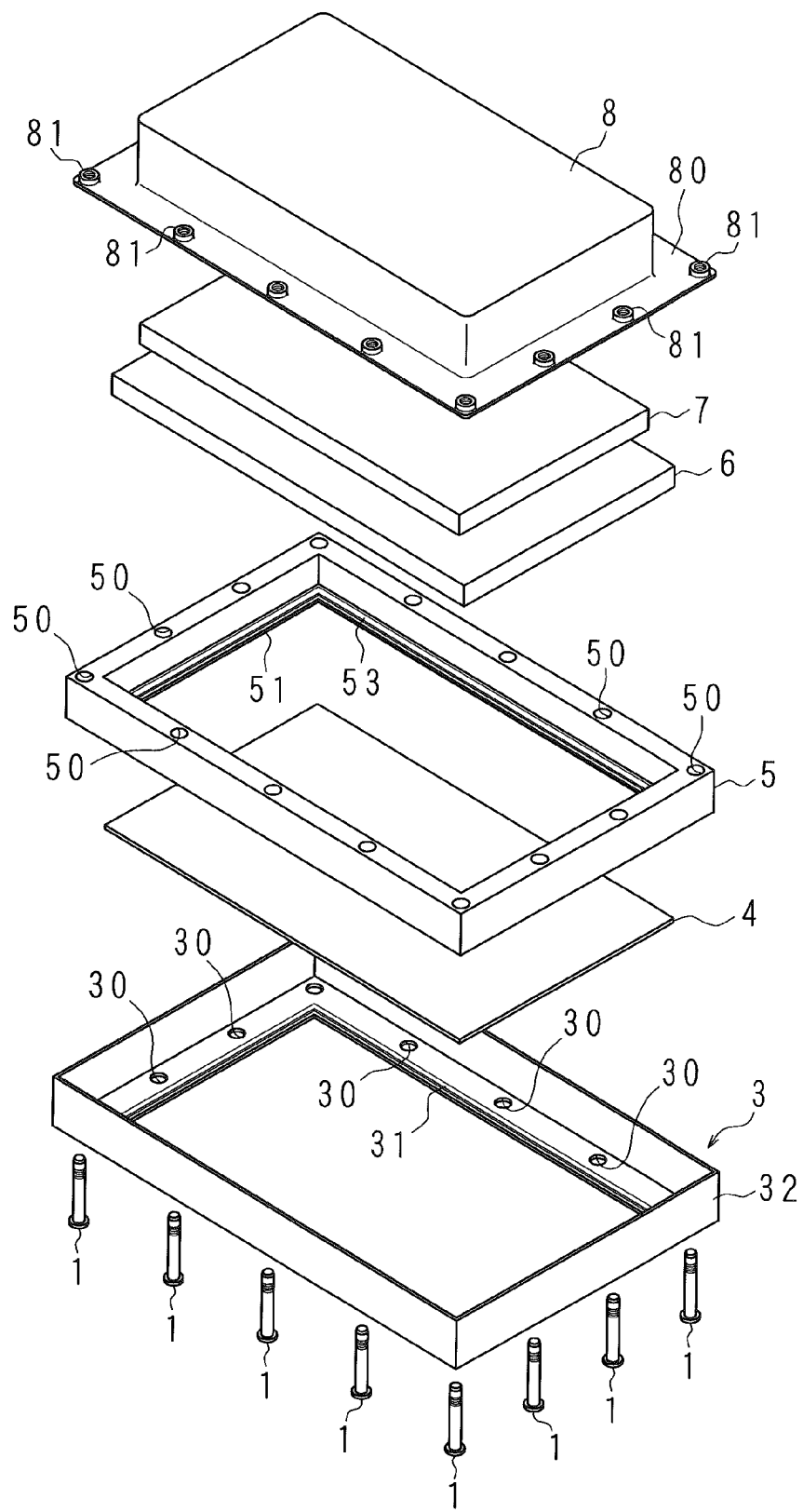
FIG. 2 is an exploded perspective view illustrating a configuration of major components of the display apparatus according to Embodiment 1.

FIG. 1 is a front view of a display apparatus according to Embodiment 1. FIG. 2 is an exploded perspective view illustrating a configuration of major components of the display apparatus according to Embodiment 1. The display apparatus according to Embodiment 1 is a liquid crystal display apparatus including a liquid crystal panel (display panel) 4 having the shape of a rectangular plate, and a direct type light source device which irradiates the liquid crystal panel 4 with light.

As illustrated in FIG. 2, the display apparatus of Embodiment 1 is constituted by a bezel 3, the liquid crystal panel 4, a panel chassis 5, an optical sheet 6, a light source unit 7 and a backlight chassis (hereinafter referred to as a BL chassis) 8 that are layered in this order and are connected as will be described later by multiple connecting members 1.

The bezel 3 has a shape of a rectangular frame and has a plate part 32 vertically protruding from the outer peripheral edge of the bezel 3. Moreover, the bezel 3 is provided with a panel pressing part 31 which is in contact with the liquid crystal panel 4 as will be described later, along the opening part on the surface on which the plate part 32 is formed. A plurality of through holes 30 are formed at the outer side of the panel pressing part 31.

The liquid crystal panel 4 is configured by, for example, a plurality of liquid crystal elements arranged in a two-dimensional matrix.

The panel chassis 5 is a rectangular frame made of resin, in which through holes 50 penetrating the panel chassis 5 in the thickness direction are formed. The panel chassis 5 has a size slightly smaller than that of the bezel 3, and the through holes 50 are formed at positions opposed to the through holes 30 in the bezel 3. While four through holes 30 and four through holes 50 are formed on a short side whereas five through holes 30 and five through holes 50 are formed on a long side, respectively separated by equal intervals, in the example illustrated in FIGS. 1 and 2, the numbers of through holes 30 and 50 are not limited thereto. Furthermore, the panel chassis 5 has a plate part 51 circumferentially formed to extend inward from the inner surface, and a sheet pressing part 53 which is in contact with the optical sheet 6 as will be described later is provided at one surface of the plate part 51 along the opening part. Furthermore, the panel pressing part 52 which is in contact with the liquid crystal panel 4 is provided on the rear surface side of the plate part 51 opposite to the sheet pressing part 53, as illustrated in FIG. 3.

As illustrated in FIG. 3, the optical sheet 6 is a rectangular sheet including layers of, for example, a diffusion sheet 61, a brightness enhance film (BEF) sheet 62, a diffusion plate 63 and the like. The diffusion plate 63 is made of, for example, PMMA (acrylic) or polycarbonate resin, and has a function of uniformly diffusing incident light in plane. The diffusion sheet 61 has a function of scattering light with a roughened surface of the sheet material made of polyester. The BEF sheet 62 has a microscopic prism or micro lens structure on the surface of a transparent polymer sheet, which serves to increase the front luminance by condensing light. If necessary, a means of laminating a BEF sheet serving to convert the incident light into linearly polarized light, on the diffusion sheet 61 using a vapor-deposited polymer film, may be employed.

The optical sheet 6 with the configuration as described above outputs light entering from one surface of the diffusion plate 63 toward the liquid crystal panel 4 as uniform flat light.

The light source unit 7 includes, as illustrated in FIG. 3, a substrate 71 having the shape of a rectangular plate, and a light source 70 mounted on one surface of the substrate 71. The light source 70 is, for example, a light emitting diode (LED), which is mounted on one surface of the substrate 71 in a two-dimensional matrix form. The light source 70 may be a cold cathode fluorescent lamp (CCFL), an external electrode fluorescent lamp (EEFL), a hot cathode fluorescent lamp (HCFL) or the like. In such cases, multiple lamps are arranged side by side.

The BL chassis 8 has a rectangular dish shape, and a flange 80 extending outward is circumferentially formed in the opening part of the BL chassis 8. The flange 80 has a plurality of protrusions 81 protruding toward the bottom of the BL chassis 8, each of the protrusions 81 being provided with a screw hole having a screw at the inner periphery thereof. The flange 80 of the BL chassis 8 has a size similar to that of the panel chassis 5, and the protrusions 81 are formed at positions opposed to the through holes 50 of the panel chassis 5 and the through holes 30 of the bezel 3. The number of protrusions 81 is not limited to the number as illustrated in FIG. 2.

FIG. 3 is a cross-sectional view taken along the line III-III in FIG. 1. As illustrated in FIG. 3, the light source device of Embodiment 1 is so configured that the light source unit 7 is attached to the bottom surface of the BL chassis 8, the optical sheet 6 is mounted on the flange 80 of the BL chassis 8, and the panel chassis 5 is disposed over the optical sheet 6. Furthermore, the display apparatus of Embodiment 1 is so configured that the liquid crystal panel 4 is mounted on the panel chassis 5, and the bezel 3 is disposed over the liquid crystal panel 4, and the bezel 3, panel chassis 5 and BL chassis 8 are fixed by a connecting member 1. Thus, in the display apparatus of Embodiment 1, the optical sheet 6 is held between the plate part 51 of the panel chassis 5 and the flange 80 of the BL chassis 8, while the liquid crystal panel 4 is held between the bezel 3 and the plate part 51 of the panel chassis 5.

The display apparatus of Embodiment 1 may also be provided with, in addition to the components described above, a reflecting sheet made of synthetic resin having high reflectivity on the back side of the light source unit 7, for example, between the light source unit 7 and the BL chassis 8.

In the display apparatus having the configuration as described above, the bezel 3 covers the liquid crystal panel 4 from the display screen side while the panel pressing part 31 is in contact with the peripheral edge of the display screen of the display panel 4. The liquid crystal panel 4 has substantially the same size as or slightly larger than that of the panel pressing part 31 of the bezel 3, and thus will not overlap the through holes 30 of the bezel 3 when in contact with the panel pressing part 31.

The panel chassis 5 is housed inside the plate part 32 of the bezel 30 in the state where its own through holes 5 are aligned with the through holes 30 of the bezel 3. In the case where the panel chassis 5 is housed in the bezel 3, the panel pressing part 52 of the panel chassis 5 makes contact with the rear surface side of a portion of the liquid crystal panel 4 which is in contact with the panel pressing part 31 of the bezel 3. Accordingly, the bezel 3 and panel chassis 5 hold the liquid crystal panel 4 between them through the panel pressing parts 31 and 52. The portion of the plate part 51 protruding from the inner peripheral surface of the panel chassis 5 corresponds to a position where the liquid crystal panel 4 may appropriately be held between the panel pressing part 31 of the bezel 3 and the panel pressing part 52 of the panel chassis 5. More specifically, in the panel chassis 5, a plate part 51 is disposed at a position separated from an end surface at the side being in contact with the bezel 3 by a distance substantially corresponding to the thickness of the layer stack of the panel pressing part 31 of the bezel 3, the liquid crystal panel 4 and the panel pressing part 52 of the panel chassis 5.

The optical sheet 6 is disposed such that the diffusion sheet 61 faces the back surface of the liquid crystal panel 4 (rear surface of the display screen) which is in contact with the panel pressing part 52 of the panel chassis 5, and that the periphery of the diffusion sheet 61 is in contact with the sheet pressing part (contact portion) 53 of the panel chassis 5. In the case where the diffusion sheet 61 is in contact with the sheet pressing part 53 of the panel chassis 5, the rear surface of the optical sheet 6 (surface on the diffusion plate 63 side) is positioned to be coplanar with the end surface of the panel chassis 5 (rear surface of the surface in contact with the bezel 3). The flange 80 of the BL chassis 8 makes contact with the end surface of the panel chassis 5 and the peripheral edge of the diffusion plate 63 of the optical sheet 6 that are coplanar with each other. The flange 80 of the BL chassis 8 is in contact with the panel chassis 5 and the optical sheet 6 (diffusion plate 63) in the state where the screw holes in the protrusions 81 are aligned with the through holes 50 in the panel chassis 5. The light source unit 7 is housed inside the BL chassis 8 while the light source 70 faces the diffusion plate 63 of the optical sheet 6.

With the configuration described above, in the display apparatus of Embodiment 1, the light emitted from the light source unit 7 (light source 70) passes through the optical sheet 6 and is directed to the liquid crystal panel 4 as uniform flat light.

Figure 4A:
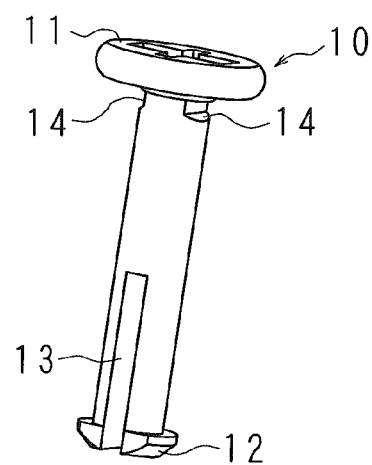
FIG. 4A is a perspective view illustrating a configuration of a connecting member.
Figure 4B:
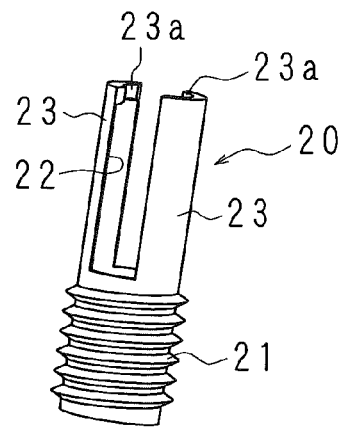
FIG. 4B is a perspective view illustrating the configuration of a connecting member.
Figure 4C:
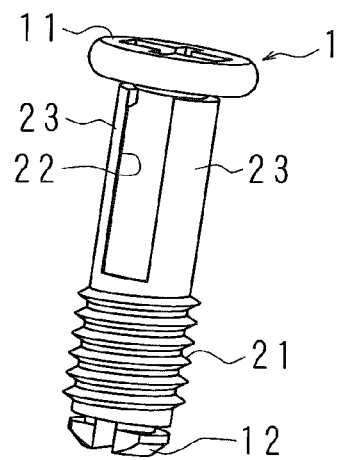
FIG. 4C is a perspective view illustrating the configuration of a connecting member.
Figure 5:
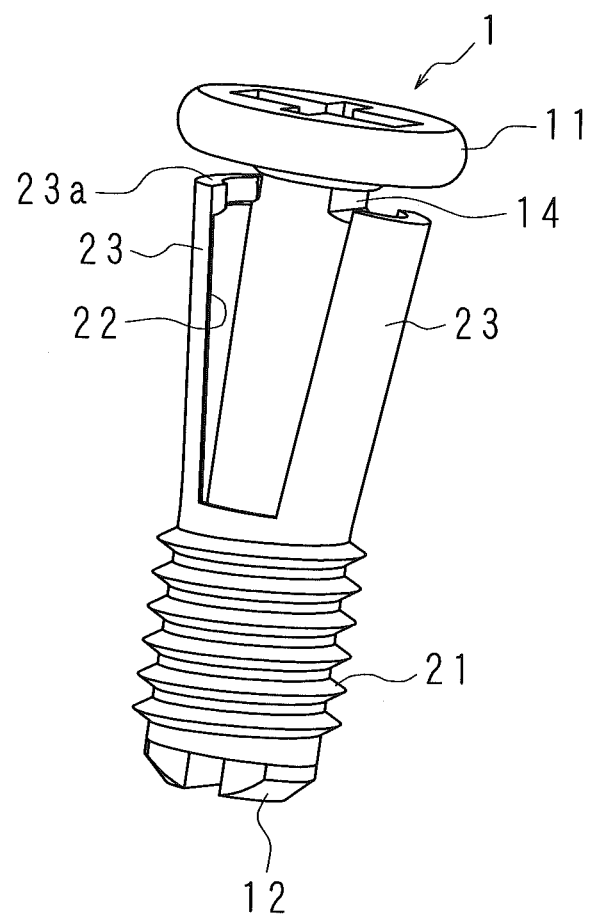
FIG. 5 is a perspective view illustrating the configuration of a connecting member.

FIGS. 4A-4C and FIG. 5 are perspective views illustrating the configuration of the connecting member 1. The connecting member 1 of Embodiment 1 is constituted by combining a columnar rod member (pressing member) 10 and a cylindrical sleeve member (attachment member) 20. FIG. 4A illustrates the rod member 10, FIG. 4B illustrates the sleeve member 20, and FIGS. 4C and 5 illustrate the state where the rod member 10 is combined with the sleeve member 20.

The rod member 10 includes, at one end thereof, a screw head (latch piece) 11 having a cross recess. At the other end of the rod member 10, a slot 13 running through the center thereof is formed from the end to near the middle part, and claws (latch pieces) 12 are formed at the respective ends of the slot 13 to protrude outward. Furthermore, two concave parts 14 are formed at the outer peripheral surface of the rod member 10 on the one end, at positions corresponding to the claws 12.

The sleeve member 20 includes a screw part 21 on the outer peripheral surface at one end thereof over an approximately half of the sleeve member 20. Moreover, at the other end of the sleeve member 20, a slot 22 running through the center is formed from the end to near the middle part, and latch parts 23 are formed by dividing the sleeve member 20 by the slot 22. The latch parts 23 have claws 23a formed inward at the respective ends thereof. The sleeve member 20 is made of a shape memory alloy which is deformed to a predetermined shape when the surrounding temperature reaches a predetermined temperature or higher. The sleeve member 20 is formed in a predetermined shape in which the ends (claws 23a) of two latch parts 23 are split out in directions away from each other as illustrated in FIG. 5, and thereafter is so deformed that the two latch parts 23 are in parallel with each other as illustrated in FIG. 4B by a press work under a room temperature. This allows the sleeve member 20 to be deformed (returned) to the state illustrated in FIG. 5 when the surrounding temperature reaches a predetermined temperature. For the shape memory alloy, a titanium alloy may be used, for example. A shape memory alloy generated with an appropriate composition may desirably be used depending on a temperature reached in the surroundings of the sleeve member 20 during the operation of the display apparatus.

The rod member 10 with the configuration described above is attached to the sleeve member 20 by inserting the claws 12 from the side of the latch parts 23 (claws 23a) of the sleeve member 20. The rod member 10 is inserted into the sleeve member 20 in the state where the two claws 12 are close to each other. When the rod member 10 reaches the end of the sleeve member 20 at the screw part 21 side, the claws 12 are returned back to the original state (the state illustrated in FIG. 4A) to be engaged with the end surface of the screw part 21. The outer diameter of the screw head 11 of the rod member 10 is larger than the outer diameter of the sleeve member 20. Thus, the screw head 11 and the claws 12 are engaged with the end surfaces of the sleeve member 20, respectively, which can prevent the rod member 10 from falling off the sleeve member 20. Moreover, in the case where the rod member 10 is inserted into the sleeve member 20, the claws 23a of the sleeve member 20 are engaged into the concave parts 14 of the rod member 10, serving as a lock for fixing the rod member 10 and the sleeve member 20 in the axial and circumferential directions.

The connecting member 1 with the configuration as described above is inserted into the through hole 30 in the bezel 3 as well as the through hole 50 in the panel chassis 5 from the display screen side of the display apparatus, is screwed to the screw hole of the protrusion 81 of the BL chassis 8, to connect the bezel 3, panel chassis 5 and BL chassis 8 with one another. When connected by the connecting member 1, the BL chassis 8 holds the light source unit 7 while clamping the optical sheet 6 between the BL chassis 8 and the panel chassis 5, which means that the BL chassis 8 and the panel chassis 5 serve as a support member for supporting the light source unit 7 and the optical sheet 6. Moreover, when the connecting member 1 is securely fastened to the screw hole of the protrusion 81 of the BL chassis 8, the optical sheet 6 is firmly held between the panel chassis 5 and the BL chassis 8, which can prevent the optical sheet 6 from moving, for example, during transportation of the display apparatus. This can prevent the surface of the optical sheet 6 from being damaged.

Figure 6:
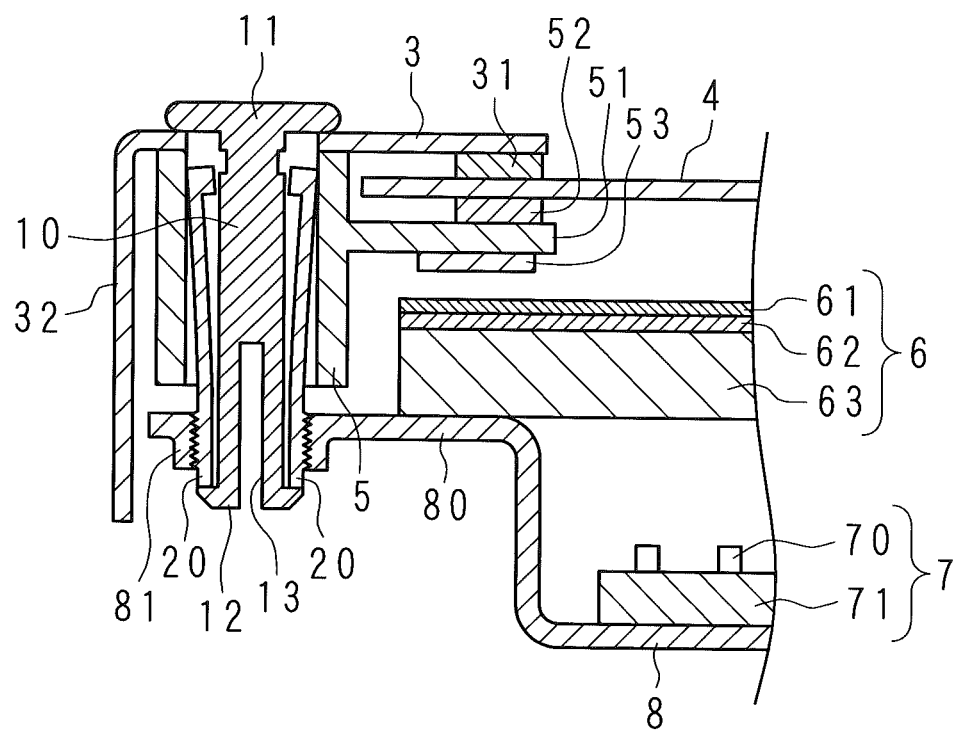
FIG. 6 is a cross-sectional view taken along the line III-III in FIG. 1.

Next, a state where the display apparatus of Embodiment 1 is in operation will be described. FIG. 6 is a cross-sectional view taken along the line III-III in FIG. 1, illustrating the state where the display apparatus is in operation.

In the display apparatus of Embodiment 1, when installed in a purchaser's house, for example, and started to operate, the light source unit 7 generates heat as it starts emitting light. Therefore, while the display apparatus is operating, the temperature inside the display apparatus is raised due to the heat from the light source unit 7.

In the display apparatus of Embodiment 1, the sleeve member 20 for the connecting member 1 connecting the bezel 3, panel chassis 5 and BL chassis 8 is made of a shape memory alloy. When the display apparatus is not in operation, the sleeve member 20 maintains the state at the time of assembly in which the two latch parts 23 are in parallel with each other while the claws 23a are engaged into the concave parts 14 of the rod member 10, as illustrated in FIGS. 3 and 4C. When the display apparatus starts operating and the surrounding temperature reaches a predetermined temperature or higher due to the heat from the light source unit 7, the sleeve member 20 is deformed to the state where the claws 23a are split out in directions away from each other, as illustrated in FIGS. 5 and 6. When the sleeve member 20 is deformed, the claws 23a engaged into the concave parts 14 of the rod member 10 are disengaged from the concave parts 14. When the claws 23a and the concave parts 14 are disengaged, the bezel 3, panel chassis 5 and rod member 10 shift their positions with respect to the sleeve member 20 and the BL chassis 8, as illustrated in FIG. 6. Since the claws 12 of the rod member 10 are engaged with the end of the sleeve member 20, the rod member 10 cannot fall off the sleeve member 20.

When the bezel 3, panel chassis 5 and rod member 10 shift their positions with respect to the sleeve member 20 and BL chassis 8, the force of the sheet pressing part 53 in the panel chassis 5 pressing the optical sheet 6 is weakened, and the sheet pressing part 53 moves away from the optical sheet 6.

During the operation of the display apparatus, the optical sheet 6 is expanded by the heat from the light source unit 7. Here, the sheet pressing part 53 of the panel chassis 5 is located away from the optical sheet 6 due to rise in the temperature inside the display apparatus, which relaxes the pressing to the optical sheet 6 by the sheet pressing part 53. Therefore, the peripheral edge part of the optical sheet 6 is not strongly pressed, and may thus spread over the flange 80 of the BL chassis 8, not causing wrinkles.

In the display apparatus of Embodiment 1, by the rod member 10 moving with respect to the sleeve member 20, the panel chassis 5 (sheet pressing part 53) moves away from the optical sheet 6. Thus, also in a narrow space, the pressing to the optical sheet 6 by the panel chassis 5 can be loosened, preventing wrinkles from occurring at the expanded optical sheet 6.

Embodiment 2

A display apparatus according to Embodiment 2 will be described below. In the display apparatus according to Embodiment 2, the configuration of a connecting member connecting the bezel 3, the panel chassis 5 and the BL chassis 8 is different from that of the display apparatus according to Embodiment 1 described above. Thus, only the connecting member is described while the other components will be denoted by the same reference numerals as those in Embodiment 1 and thus will not be described in detail.

Figure 8:
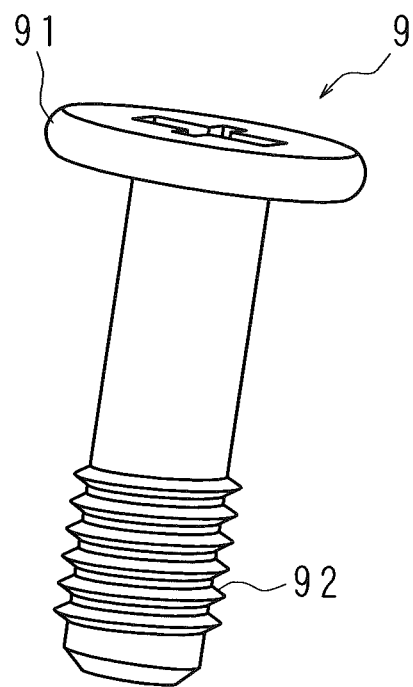
FIG. 8 is a perspective view illustrating the configuration of a connecting member according to Embodiment 2.
Figure 9:
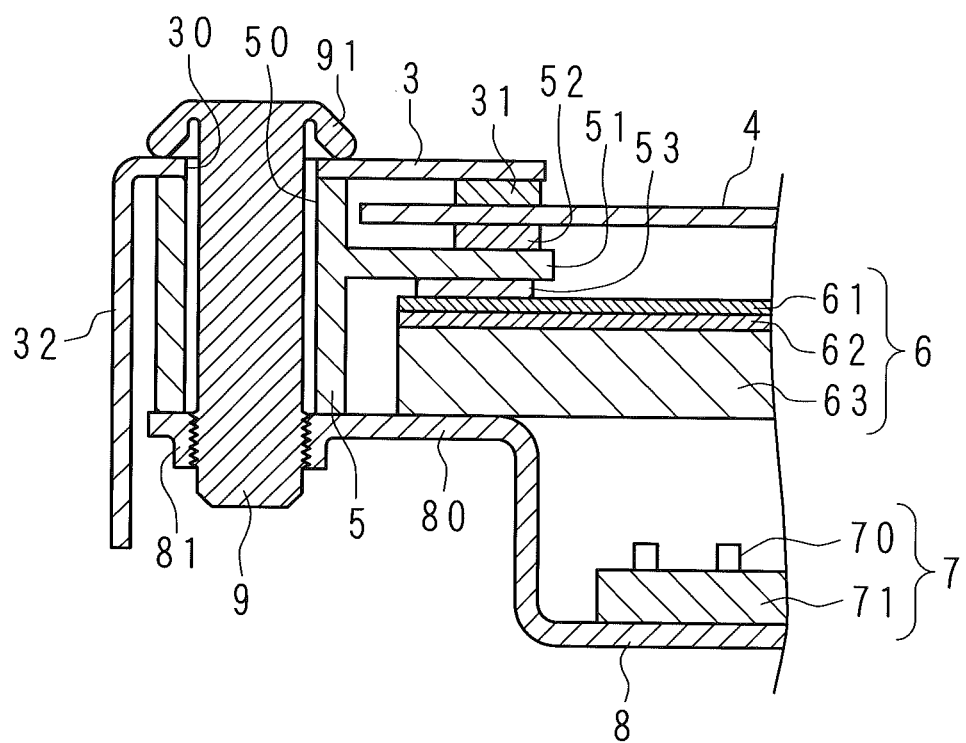
FIG. 9 is a cross-sectional view taken along the line III-III in FIG. 1.
Figure 10:
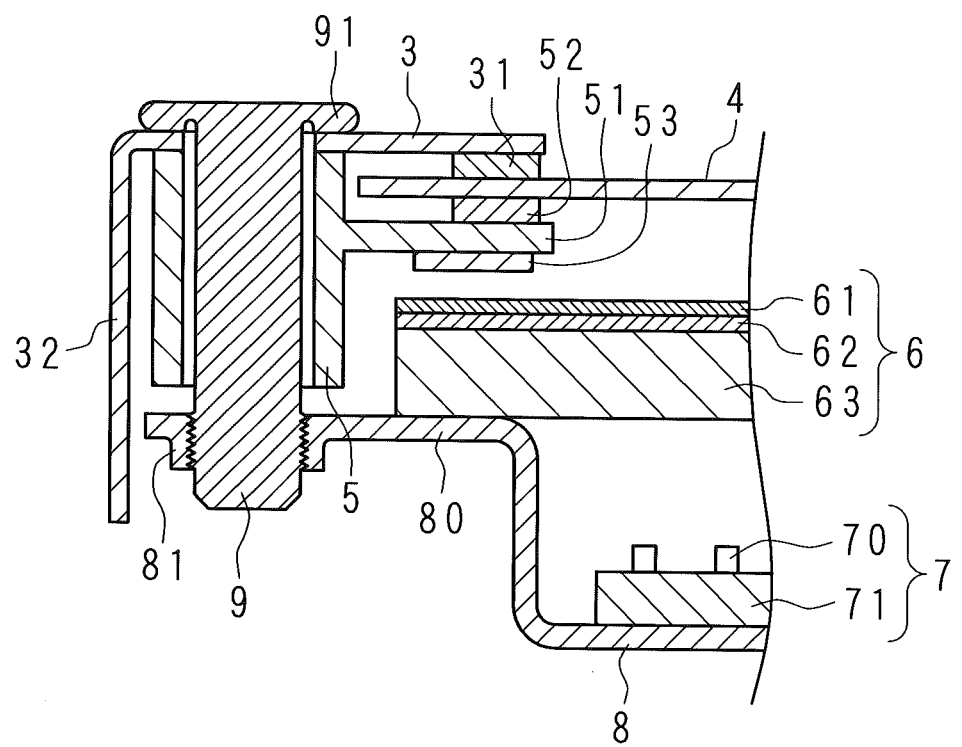
FIG. 10 is a cross-sectional view taken along the line III-III in FIG. 1.

FIG. 7 and FIG. 8 are perspective views illustrating the configuration of the connecting member according to Embodiment 2. FIG. 9 and FIG. 10 are cross-sectional views taken along the line III-III in FIG. 1. FIGS. 7 and 9 illustrate the state where the display apparatus is not in operation, whereas FIGS. 8 and 10 illustrate the state where the display apparatus is in operation.

A connecting member 9 of Embodiment 2 is constituted by one member. The connecting member 9 of Embodiment 2 has a columnar shape, and includes a screw head (pressing piece) 91 having a cross recess at one end thereof and a screw part 92 on the outer peripheral surface at the substantially half of the connecting member 9 at the other end thereof. The connecting member 9 is formed of a shape memory alloy deformed to a predetermined shape when the surrounding temperature reaches a predetermined temperature or higher. The connecting member 9 is formed in a predetermined shape in which the screw head 91 has the shape of a flat plate, as illustrated in FIG. 8, and thereafter is so deformed that the surface surrounding the cross recess of the screw head 91 is a tapered surface, as illustrated in FIG. 7, by a press work under a room temperature. The connecting member 9 is thereby deformed (returned) to be in the state as illustrated in FIG. 8 when the surrounding temperature reaches the predetermined temperature. Also in Embodiment 2, for a shape memory alloy, a titanium alloy may be used, for example. A shape memory alloy generated with an appropriate composition may desirably be used depending on a temperature reached in the surroundings of the connecting member 9 during the operation of the display apparatus.

The connecting member 9 with the configuration as described above is inserted into the through hole 30 in the bezel 3 as well as the through hole 50 in the panel chassis 5 from the display screen side of the display apparatus, is screwed to the screw hole of the protrusion 81 of the BL chassis 8, to connect the bezel 3, panel chassis 5 and BL chassis 8 with one another. In Embodiment 2 also, when the connecting member 9 is tightly fastened to the screw hole of the protrusion 81 of the BL chassis 8, the optical sheet 6 is firmly held between the panel chassis 5 and the BL chassis 8, which prevents the optical sheet 6 from moving, for example, during transportation of the display apparatus. This can prevent the surface of the optical sheet 6 from being damaged.

When the display apparatus of Embodiment 2 starts to operate, the light source unit 7 also generates heat as it starts emitting light. Therefore, while the display apparatus is in operation, the temperature inside the display apparatus is raised due to the heat from the light source unit 7.

Furthermore, in the display apparatus of Embodiment 2, the connecting member 9 for connecting the bezel 3, panel chassis 5 and BL chassis 8 is formed with a shape memory alloy. When the display apparatus is not in operation, the connecting member 9 maintains the state at the time of assembly where the surface surrounding the cross recess of the screw head 91 is a tapered surface, as illustrated in FIGS. 7 and 9. That is, the screw head 91 is formed to have a shape inclined from one end of the connecting member 9 to the other end thereof.

When the display apparatus starts operating and the surrounding temperature reaches a predetermined temperature or higher due to heat from the light source unit 7, the connecting member 9 is deformed to be in a state where the screw head 91 has the shape of a flat plate as illustrated in FIGS. 8 and 10. When the connecting member 9 is deformed, as illustrated in FIG. 10, the bezel 3 and the panel chassis 5 shift their positions with respect to the BL chassis 8 by the deformed amount of the connecting member 9. When the bezel 3 and the panel chassis 5 shift their positions with respect to the BL chassis 8, the force of the sheet pressing part 53 in the panel chassis 5 pressing the optical sheet 6 is weakened, and the sheet pressing part 53 moves away from the optical sheet 6. As such, the pressing to the optical sheet 6 by the sheet pressing part 53 is relaxed, so that the optical sheet 6 expanded by the heat from the light source unit 7 may spread over the flange 80 of the BL chassis 8, not causing wrinkles.

In the display apparatus of Embodiment 2, the screw head 91 of the connecting member 9 is deformed, thereby making the panel chassis 5 (sheet pressing part 53) move away from the optical sheet 6. Accordingly, also in a narrow space, the pressing by the panel chassis 5 to the optical sheet 6 may be loosened, which can prevent wrinkles from occurring at the expanded optical sheet 6.

While Embodiments 1 and 2 above illustrated examples where the light source device according to the present invention is applied to a light source device of a direct type, the present invention may also be applicable to a light source device of an edge light type including a light guide plate and to which light is directed from an end surface of a light guide plate.

Moreover, in Embodiments 1 and 2 described above, for the light source device according to the present invention, the display apparatus including the liquid crystal panel 4 and the light source device has been described as an example. The present invention may, however, also be applicable to a lighting device (light source device) not including the liquid crystal panel 4.

The embodiments disclosed herein are to be construed as illustrative and not restrictive in all aspects. For example, the effect of the present invention may also be produced with a backlight of the edge light type. The scope of the invention is defined by the appended claims rather than by the description preceding them, and all changes that fall within metes and bounds of the claims, or equivalence of such metes and bounds thereof are therefore intended to be embraced by the claims. Furthermore, the technical features disclosed in the embodiments can be combined with one another.

It is noted that, as used herein and in the appended claims, the singular forms "a", "an", and "the" include plural referents unless the context clearly dictates otherwise.

The invention claimed is:

1. A light source device, comprising:
a light source;
an optical sheet disposed with one surface facing the light source;

a support member which supports the light source and the optical sheet;

a contact portion which is in contact with a peripheral edge part of the other surface of the optical sheet to hold the optical sheet between the contact portion and the support member; and a connecting member which connects the contact portion and the support member in a state where the contact portion is pressed to the optical sheet, wherein:

the connecting member has a weakened force of pressing the contact portion when a surrounding temperature reaches a predetermined temperature or higher, the connecting member includes a pressing member pressing the contact portion to the peripheral edge part of the other surface of the optical sheet, and an attachment member having a latch part latched to the pressing member and being attached to the support member, and the attachment member is formed of a shape memory alloy, and is configured to be deformed to a shape in which a latch to the pressing member by the latch part is disengaged when the surrounding temperature reaches the predetermined temperature or higher.

2. The light source device according to claim 1, wherein the pressing member has a columnar shape, and includes latch pieces protruding from each end of an outer peripheral surface of the pressing member, and a concave part formed at an appropriate position on the outer peripheral surface, the attachment member has a tubular shape, and includes a screw part formed on an outer peripheral surface of the attachment member, and a claw protruding from one end surface of the attachment member in an axial direction and having a protruding end bent inward, the connecting member is so configured that the pressing member is inserted into the attachment member, each latch piece is engaged with each end of the attachment member and the claw is engaged with the concave part, the support member has a shape of a plate supporting the optical sheet from the one surface side, and has a screw hole penetrating the support member in a thickness direction, the contact portion has a shape of a frame plate and has a through hole penetrating the contact portion in a thickness direction, and the connecting member is configured to connect the contact portion and the support member by screwing the screw part into the screw hole via the through hole.

3. The light source device according to claim 2, wherein the concave part is formed on an outer peripheral surface of the pressing member at one end side of the pressing member, and the other end of the pressing member is provided with a slot passing through a center of the pressing member.

4. A display apparatus, comprising:

the light source device according to claim 1; and a display panel which displays an image using light emitted from the light source device.

5. A light source device, comprising:

a light source;

an optical sheet disposed with one surface facing the light source;

a support member which supports the light source and the optical sheet;

a contact portion which is in contact with a peripheral edge part of the other surface of the optical sheet to hold the optical sheet between the contact portion and the support member; and a connecting member which connects the contact portion and the support member in a state where the contact portion is pressed to the optical sheet, wherein:

the connecting member has a weakened force of pressing the contact portion when a surrounding temperature reaches a predetermined temperature or higher, the connecting member has a columnar shape, and includes a pressing piece protruding from one end of an outer peripheral surface of the connecting member to press the contact portion to the optical sheet, and a screw part formed at the other end side of the outer peripheral surface, the support member has a shape of a plate supporting the optical sheet from the one surface side, and has a screw hole penetrating the support member in a thickness direction, the contact portion has a shape of a frame plate and has a through hole penetrating the contact portion in a thickness direction, the connecting member is configured to connect the contact portion and the support member by screwing the screw part into the screw hole via the through hole, and the pressing piece is formed of a shape memory alloy, and is deformed to a shape with a weakened force of pressing the contact portion when a surrounding temperature reaches the predetermined temperature or higher.

6. The light source device according to claim 5, wherein the pressing piece protrudes from the one end of the outer peripheral surface to be inclined toward the other end, and is deformed to a shape having a coplanar surface with one end surface of the connecting member when the surrounding temperature reaches the predetermined temperature or higher.

7. A display apparatus, comprising:

the light source device according to claim 5; and a display panel which displays an image using light emitted from the light source device.

* * * * *